United States Patent [19]

Parker

[11] Patent Number: 4,716,464

[45] Date of Patent: Dec. 29, 1987

[54] SINGLE CHANNEL IF FOR VIDEO AND AUDIO

[75] Inventor: Robert P. Parker, Indianapolis, Ind.

[73] Assignee: RCA Corporation, Princeton, N.J.

[21] Appl. No.: 858,457

[22] Filed: Apr. 30, 1986

[51] Int. Cl.⁴ .................... H04N 5/62; H04N 5/44; H04N 7/04

[52] U.S. Cl. .................... 358/197; 358/188; 358/143

[58] Field of Search ............ 358/188, 191.1, 197, 358/143, 144; 333/193

[56] References Cited

U.S. PATENT DOCUMENTS

| | | | |
|---|---|---|---|
| 3,894,286 | 7/1975 | Armstrong | 325/438 |
| 4,006,290 | 2/1977 | Momberger et al. | 358/196 |
| 4,271,433 | 6/1981 | Theriault | 358/191.1 |
| 4,484,222 | 11/1984 | Banach | 358/196 |
| 4,490,743 | 12/1984 | Mycynek et al. | 358/197 |
| 4,513,323 | 4/1985 | Patel | 358/197 |
| 4,602,287 | 7/1986 | Fockens | 358/197 |
| 4,602,288 | 7/1986 | Everett | 358/197 |
| 4,639,786 | 1/1987 | Tamer et al. | 358/197 |

Primary Examiner—Howard W. Britton
Assistant Examiner—John K. Peng
Attorney, Agent, or Firm—Paul J. Rasmussen; Peter M. Emanuel; Ronald H. Kurdyla

[57] ABSTRACT

A stereo television receiver processes the picture and intercarrier sound carrier signals in a common intermediate frequency (IF) section. The IF characteristic is modified such that the overall transmission characteristic of the receiver exhibits a modified Nyquist slope having a shelf portion of flat attenuation over a frequency band including within it the picture carrier frequency. This reduces the incidental phase modulation of the picture carrier signal due to asymmetrical attenuation of sidebands by the Nyquist slope, thereby reducing the associated intercarrier buzz.

17 Claims, 5 Drawing Figures

SINGLE CHANNEL IF FOR VIDEO AND AUDIO

The present invention relates to the field of television (TV) intermediate frequency (IF) stages in TV receivers, particularly for multichannel sound, including stereo sound.

The sound transmission accompanying TV picture transmission in, for example, the NTSC system used in the United States, is a frequency modulated (FM) signal transmitted 4.5 MHz above the radio frequency (RF) picture carrier. In a typical TV receiver, the picture and sound signals are processed together through the RF stage and the mixer (also called the first detector). Typically, modern TV receivers are superheterodynes using a local oscillator frequency above the receiving frequency. As a result, the sound and picture carrier signals appear transposed in the IF section, i.e., the sound carrier frequency appears 4.5 MHz below the picture carrier frequency. The IF frequency used in the United States is effectively standardized and results in the IF picture and sound carrier signals being at 45.75 MHz and 41.25 MHz, respectively.

A number of alternatives have been employed for further processing the IF signal provided by the mixer. In the intercarrier sound separation system, both the picture and sound carrier signals are amplified and filtered in a common IF section. The two carrier signals are mixed in the video detector and a 4.5 MHz difference frequency signal containing the FM sound carrier signal appears at the detector output. The 4.5 MHz signal is applied to an FM detector to provide a baseband sound signal output. The intercarrier system is economical in cost and it maintains the advantage that the frequency and detection of the resulting sound carrier signal are substantially independent of receiver tuning because the frequency difference between the carriers is accurately established at the transmitter.

However, the intercarrier system is subject to interference in the 4.5 MHz sound carrier signal which may cause distorted sound. One form of such interference is caused by the picture carrier signal in the following manner. As is known, the overall transmission characteristics for TV receivers are designed for vestigial sideband modulation. The characteristic of a typical receiver exhibits an approximately linear attenuation slope (sometimes called the "Nyquist slope") over the ±750 kHz double sideband (DSB) region (U.S. standards), with the picture carrier frequency located at the midpoint of the slope (−6 dB relative to the single sideband portion). As a result, the sideband signals, which occur in symmetrical pairs in the DSB portion, are asymmetrically attenuated by the Nyquist slope portion of the transmission characteristic. A known effect of sideband asymmetry is to introduce incidental phase modulation (IPM) in the picture carrier signal. As was mentioned above in relation to the intercarrier sound separation system, the picture and sound carrier signals are mixed in the video detector to produce a 4.5 MHz FM sound carrier. Any IPM in the picture carrier which is not also identically present in the sound carrier signal will also appear as IPM of the 4.5 MHz FM sound carrier signal and can cause an undesirable interference signal in the audio output of the FM detector, commonly known as intercarrier buzz. While intercarrier buzz may be acceptable in monophonic sound reception, it causes more serious interference in the reception of stereophonic (stereo) and Second Audio Program (SAP) transmissions which use subcarrier frequencies (in the U.S.) of twice and five times the horizontal sweep rate (31.468 kHz and 78.67 kHz), respectively. As is known, the response of an FM detector to a given interference phase deviation is greater for high interference frequencies than for low interference frequencies. Accordingly, IPM of the sound carrier by harmonics of the horizontal synchronizing signals which are modulated on the picture carrier can cause particularly objectionable levels of interference in the audio output of stereo and SAP systems.

Alternative sound separation systems which have been employed, include the "split-carrier sound" and "quasi-parallel sound" systems. In those systems, the sound signal is separated out before the picture IF and then filtered and otherwise processed separately. While this approach avoids the effect of the Nyquist slope (which is primarily provided by the picture IF section), it requires more elaborate apparatus for separate IF signal processing and is therefore more costly than the intercarrier system.

In accordance with a first aspect of the invention, a signal filter has a generally bandpass type attenuation characteristic having first and second flank portions and a substantially flat center portion. For a signal of monotonically changing frequency, the attenuation decreases from a relatively high value through the first flank portion, then remains at a relatively low value through the center portion. The attenuation then increases through a first part of the second flank portion at a first rate of change, changes at a second rate of change substantially different from the first rate of change through a second part of the second flank portion and increases through a third part of the second portion at a third rate of change substantially similar to the first rate of change.

In accordance with a second aspect of the invention, a television receiver includes a radio frequency tuner and an intermediate frequency section. The tuner and the intermediate frequency section have an overall transmission characteristic exhibiting a Nyquist attenuation slope over upper and lower frequency ranges. The upper and lower frequency ranges respectively adjoin a predetermined frequency range intermediate the upper and lower frequency ranges. The overall transmission characteristic exhibits an attenuation slope in the predetermined frequency range that is smaller than the Nyquist slope.

In the accompanying drawings.

Figure 1:
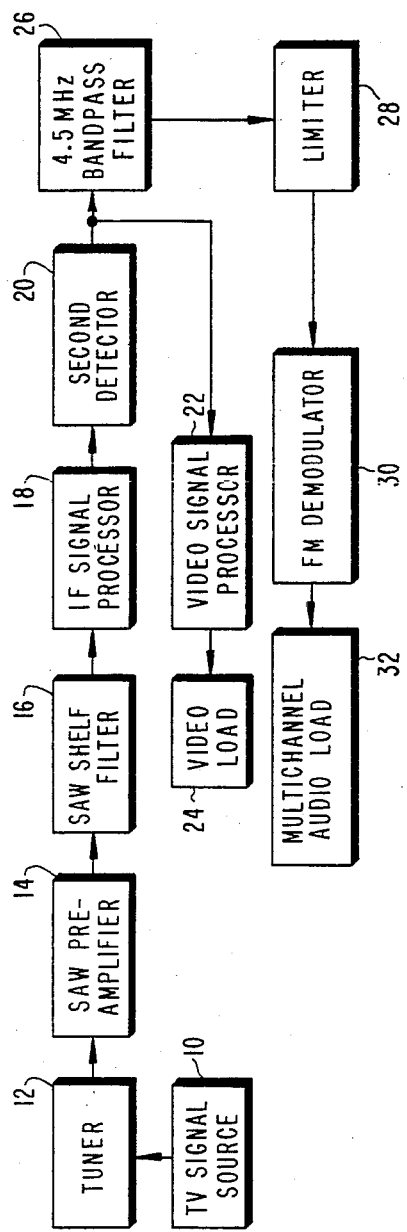
FIG. 1 is a block diagram of a television receiver showing a preferred embodiment of the present invention.

In the television (TV) receiver of FIG. 1, a radio frequency (RF) signal provided by a TV signal source 10 is selected by a tuner 12 and converted to an intermediate frequency (IF) signal. (A local oscillator and mixer in tuner 12 are not shown separately.) For convenience in the present description, the IF is taken to be 45.75 MHz, which is the standard IF in the United States, although the exact frequency is not important to the invention. The IF signal is amplified by a surface acoustic wave (SAW) filter preamplifier 14 and applied to a SAW "shelf" filter 16, the special characteristics of which will later be described in detail. Ordinary SAW filters are commonly employed for IF selectivity in TV receivers, in conjunction with a gain block. Such a filter can provide the entire passband shape and adjacent channel attenuation required by a TV receiver. It is noted that the picture and sound signals are processed in common by the same IF section. The remaining portions of the receiver of FIG. 1 are conventional in operation. The filtered IF signal from SAW shelf filter 16 is further processed in conventional manner by an IF signal processor block 18 and thereafter is applied to a second detector 20. The video output signal of second detector 20 is processed by a video signal processor 22 which drives a video load, such as a kinescope display or recording apparatus. Detector 20 provides a sound IF output signal by mixing the picture and sound carriers, in accordance with the intercarrier system. The sound IF output signal of second detector 20 is selected by a 4.5 MHz bandpass filter 26, amplitude limited by a limiter 28, and demodulated by an FM demodulator 30. The audio output of demodulator 30, which may comprise, for example, a plurality of channels such as left and right stereo signals or a second audio program (SAP) channel, is applied to a multi-channel audio load 32. Audio load 32 may comprise, for example, loud speakers, headphones, recording apparatus, or a remote audio re-transmission link.

Figure 2:
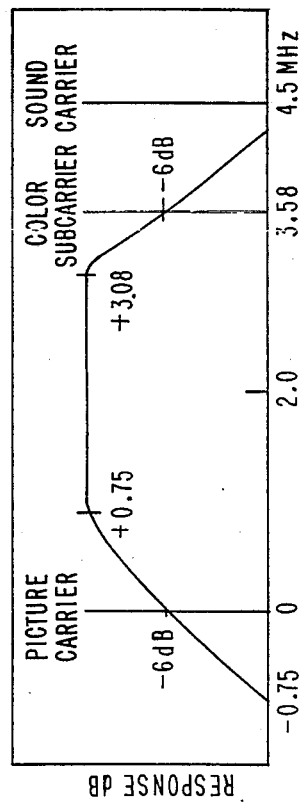
FIG. 2 shows a television receiver characteristic of amplitude response as a function of frequency.

The operation of the TV receiver of FIG. 1 will be better understood by first considering the type of response generally required in a TV receiver for proper processing of the standard vestigial sideband television signal. FIG. 2 shows the amplitude response curve for a typical modern television receiver and the frequency relationships of the picture carrier, sound carrier, and color subcarrier in accordance with United States TV standards. The (ordinate) response scale is not accurately to scale, and the frequency scale is in MHz, normalized so that zero corresponds to the picture carrier. The transmitted vestigial sideband signal employs double sideband modulation for the lower frequency portion of the TV baseband signal (approximately 0–750 kHz), then a vestigial sideband region, followed by a single sideband region. See, for example, Television Engineering Handbook, K. Blair Benson, McGraw-Hill Book Company, New York; 1986, p. 21.42 ff., p. 21.75 ff. The second detector output signal amplitude for the double sideband portion would be double the amplitude for the single sideband portion, if the receiver IF amplitude versus frequency response characteristic were not designed to compensate for the two-to-one relationship. The part of the receiver amplitude response curve or transmission characteristic for providing compensation is generally known as the "Nyquist slope" (referred to above) and takes the form of an approximately linear slope over the ±750 kHz double sideband region with the picture carrier located at the (−6 dB) midpoint (United States standard). (See Television Engineering Handbook, cited above.)

Figure 3:
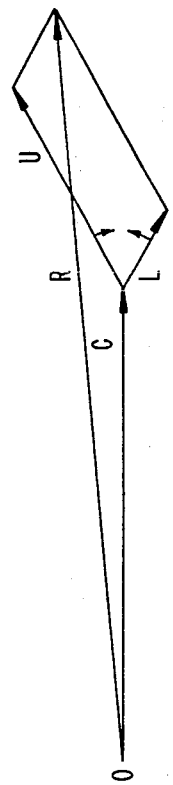
FIG. 3 is a vector diagram, helpful to an understanding of the present invention.

Since the picture carrier is double sideband amplitude modulated over the Nyquist slope region, each pair of sidebands on the Nyquist slope will, in general, be asymmetrically attenuated in prior TV receivers not employing the present invention. This results in incidental phase modulation (IPM) of the picture carrier, as will be understood from FIG. 3, which shows a vector diagram for the picture carrier (C), and the upper (U) and lower (L) sidebands. With reference to a set of coordinates rotating synchronously with vector C, vector L rotates counterclockwise (representing a lower frequency than the carrier) and vector U rotates clockwise (representing a higher frequency than the carrier). When U and L have the same magnitude, the resultant vector (R) remains in phase with C and only its length oscillates. When U and L have differing magnitudes, as results from the Nyquist slope, the phase of R oscillates about C, indicating IPM of the picture carrier signal.

As was mentioned earlier, IPM of the picture carrier signal will appear as IPM of the 4.5 MHz sound IF signal, which is derived by mixing the picture and sound carriers in the second detector. Interference due to IPM is particularly objectionable when it occurs at high frequencies such as are employed for stereo and SAP subcarriers, since a given phase change represents a greater frequency modulation deviation the higher the modulation frequency.

It is herein recognized that even the high frequency IPM which can interfere with stereo and SAP subcarriers is associated with picture carrier sidebands which occupy only a relatively small portion of the Nyquist slope. For example, the sideband portions liable to cause IPM interference with the stereo and SAP subcarriers occur within about ±30 kHz and ±160 kHz, of the picture carrier, respectively, whereas the Nyquist slope extends to ±750 kHz of the picture carrier.

Figure 4:
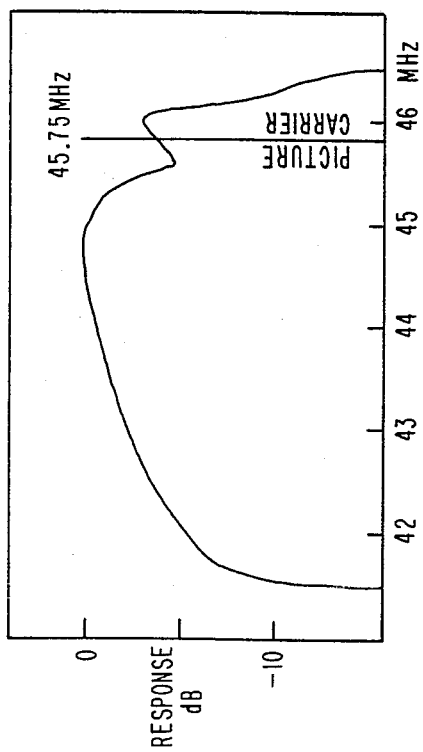

In accordance with the present invention, shelf filter 16 differs from a prior television IF filter. The Nyquist slope portion of the transmission characteristic of filter 16 exhibits a break or "shelf" over a frequency range including the picture carrier frequency, as shown in FIG. 4 and as will be explained later in more detail. Within the frequency range of the shelf, the transmission characteristic (or response) of filter 16 exhibits a slope that is different from the Nyquist slope, while for frequencies above and below the shelf frequency range, the slope of the transmission characteristic is slightly greater then the Nyquist slope employed in ordinary television IP filters.

For the purpose of explanation, consider first the case where the slope of the transmission characteristic of filter 16 ("shelf slope" ) within the shelf frequency range is close to zero, i.e. is flat with the substantially no change in response over the shelf frequency width. Picture carrier sidebands within the shelf frequency width are no longer assymmetrically attenuated and do not cause IPM of the picture carrier. When the shelf frequency width is made wide enough (e.g. ±160 kHz) to include substantially all potentially interfering sidebands of the picture carrier, IPM capable of interfering with stereo and SAP channels is substantially eliminated. Accordingly, second detector 20 derives an intercarrier sound IF by mixing a picture carrier substantially free of troublesome IPM with the intercarrier sound carrier, resulting in substantially buzz-free sound. As was previously discussed, only a small portion of the total Nyquist slope need be affected by the shelf frequency range. The picture carrier visual information content is not significantly affected by the shelf.

Figure 5:
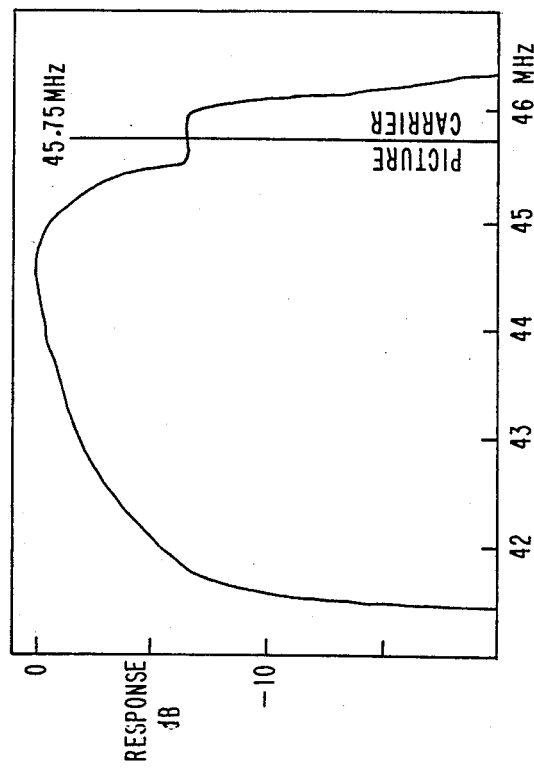
FIGS. 4 and 5 show characteristics of response curves, helpful to an understanding of the present invention.

In the above explanation, the shelf slope of filter 16 has been assumed to be zero. However, since tuner 12 typically exhibits a selective transmission characteristic, the overall transmission characteristic of the television receiver needs to be considered for the RF signal being applied to tuner 12. With reference to the RF input signal to tuner 12, it is the overall transmission characteristic which exhibits a flat shelf slope around the picture carrier frequency. In order for the TV receiver to exhibit a flat overall transmission shelf, filter 16 exhibits a non-zero shelf slope which compensates for the tuner transmission characteristic. FIG. 4 shows the IF transmission characteristic for filter 12 which takes into account the effect of the selectivity of tuner 12. Accordingly, the characteristic of FIG. 4 exhibits a non-zero shelf slope at 45.75 MHz, the picture carrier frequency. When the transmission characteristic of tuner 12 is taken into account, the overall transmission characteristic of the receiver of FIG. 1 (as referred to the IF) is as shown in FIG. 5. For a monotonically increasing frequency, the response increases rapidly along a first flank portion, then levels off over a top portion, The response then drops rapidly along a first part of a second flank portion, levels off at the "shelf", then drops again rapidly along a second part of the second flank portion. When seen from the RF input of tuner 12, the overall transmission characteristic has the same shape except for frequency inversion.

The implementation of the invention in accordance with the described embodiment is illustrative. Various modifications will suggest themselves to one skilled in the art and such modifications are contemplated to be within the scope of the present invention defined by the claims following. For example, the invention need not be embodied in a complete television receiver, since an IF section or a filter unit incorporating the invention may be employed separately for processing a television signal. Furthermore, the transmission characteristic of the invention need not be obtained from a SAW filter. A distributed gain and selectivity IF section may be employed rather than using gain and selectivity blocks.

What is claimed is:

1. A television receiver for a TV signal comprising picture and sound carrier signals, including radio frequency (RF) tuner means having a first nonzero amplitude versus frequency response over a predetermined frequency range intermediate upper and lower adjoining frequency ranges, and an intermediate frequency (IF) section coupled thereto for processing said signals, said RF tuner and IF section having an overall transmission characteristic exhibiting a Nyquist attenuation slope over said upper and lower frequency ranges respectively adjoining said predetermined frequency range intermediate said upper and lower frequency ranges, wherein to compensate for said first response said IF section exhibits a second nonzero amplitude versus frequency response, different from said first response, over said predetermined frequency range such that said overall transmission characteristic exhibits substantially no variation of attenuation with frequency in said predetermined frequency range.

2. A television receiver as recited in claim 1 wherein the frequency of said picture carrier signal is within said predetermined frequency range.

3. A television receiver as recited in claim 2 wherein said picture and sound carriers are processed in a common signal path of said IF section.

4. A television receiver as recited in claim 3 wherein said sound carrier signal comprises a baseband signal and a modulated subcarrier signal.

5. A television receiver as recited in claim 3 wherein said sound carrier signal comprises a plurality of sound channel signal components.

6. A television receiver as recited in claim 5 wherein said plurality of sound channel signal components constitute stereo signals.

7. A television receiver for vestigal sideband signals, including radio frequency (RF) tuner means having a first nonzero amplitude versus frequency response over a predetermined frequency range intermediate upper and lower adjoining frequency ranges, and an intermediate frequency (IF) section coupled thereto for processing picture and intercarrier sound carrier signals in a common signal path, said receiver having an overall transmission characteristic through said tuner and IF section exhibiting an attenuation slope corresponding substantially to a Nyquist slope for processing of said vestigial sideband signals over said upper and lower frequency ranges respectively adjoining said predetermined frequency range intermediate said upper and lower frequency ranges, wherein to compensate for said first response said IF section exhibits a second nonzero amplitude versus frequency response, different from said first response, over said predetermined frequency range such that said overall transmission characteristic exhibits substantially constant attenuation over said predetermined frequency range.

8. A television receiver as recited in claim 7 wherein the frequency of said picture carrier signal is within said predetermined frequency range.

9. A television receiver as recited in claim 8 wherein said predetermined frequency range includes at least an upper and a lower sideband frequency component associated with said picture carrier signal.

10. A television receiver as recited in claim 9 wherein said intercarrier sound carrier signal includes a modulated subcarrier.

11. A television receiver as recited in claim 10 wherein said subcarrier is modulated by a stereo component signal.

12. A television receiver as recited in claim 10 wherein said subcarrier is modulated by a second audio program signal.

13. A television receiver as recited in claim 7 wherein said IF section includes surface acoustic wave (SAW) filter means for providing an IF selectivity characteristic.

14. A television receiver as recited in claim 13 wherein said SAW filter means provides an IF selectivity characteristic exhibiting a variation of attenuation over said predetermined frequency range such that said overall transmission characteristic through said tuner and IF section exhibits said substantially constant attenuation over said predetermined frequency range.

15. An intermediate frequency (IF) section in a video signal processing system including a tuner, said IF section having a first nonzero amplitude versus frequency transmission characteristic for processing a signal provided by said tuner having a second nonzero amplitude versus frequency transmission characteristic, and providing an overall transmission characteristic through said tuner and said If section such that said overall transmission characteristic exhibits a generally bandpass type attenuation characteristic having first and second flank portions and a center portion, such that, for a signal of monotonically changing frequency, said attenuation decreases from a relatively high value through said first flank portion, remains at a relatively low value through said center portion, increases through a first part of said second flank portion at a nonzero first rate of change, progresses through a second part of said second flank portion at a substantially zero second rate of change, and increases through a third part of said second portion at a nonzero third rate of change substantially similar to said first rate of change.

16. An intermediate frequency section as recited in claim 15 wherein said second part of said second flank portion and said center portion extend over a relatively narrow and a relatively wide frequency range, respectively.

17. An intermediate frequency section as recited in claim 16 wherein said attenuation characteristic is exhibited for a monotonically increasing frequency.

* * * * *